United States Patent [19]

Takasaki et al.

[11] Patent Number: 5,014,669
[45] Date of Patent: May 14, 1991

[54] SYSTEM AND METHOD FOR CONTROLLING IGNITION TIMING FOR INTERNAL COMBUSTION ENGINE HAVING CYLINDER BANKS

[75] Inventors: Tadaoki Takasaki; Shinsuke Nakazawa, both of Kanagawa, Japan

[73] Assignee: Nissan Motor Company, Limited, Yokohama, Japan

[21] Appl. No.: 525,396

[22] Filed: May 18, 1990

[51] Int. Cl.$^5$ .................................. F02P 5/15
[52] U.S. Cl. .................................. 123/414; 123/417; 123/418; 123/421; 123/643
[58] Field of Search ............... 123/414, 416, 417, 418, 123/421, 422, 423, 612, 643

[56] References Cited

U.S. PATENT DOCUMENTS

| | | | |
|---|---|---|---|
| 4,317,437 | 3/1982 | Lindgren | 123/414 |
| 4,370,964 | 2/1983 | Muranaka et al. | 123/422 X |
| 4,497,306 | 2/1985 | Hamai et al. | 123/620 |
| 4,638,780 | 1/1987 | Trinh et al. | 123/417 X |
| 4,658,789 | 4/1987 | Morita | 123/422 |
| 4,747,389 | 5/1988 | Yuzawa et al. | 123/643 |
| 4,757,798 | 7/1988 | Sasaki | 123/643 |
| 4,796,208 | 1/1989 | Kumagai et al. | 123/414 X |

FOREIGN PATENT DOCUMENTS

55-112861 9/1980 Japan .

*Primary Examiner*—Willis R. Wolfe
*Attorney, Agent, or Firm*—Foley & Lardner

[57] ABSTRACT

A system and method for controlling ignition timing for an internal combustion engine having cylinder bank rows are disclosed in which the ignition timings for the cylinders belonging to one of the cylinder banks determined according to engine load and engine revolution speed and are corrected according to differences in the ignition timings for the cylinders of both cylinder bank rows so as to eliminate variations in the ignition timings between each cylinder bank row. The crank angle sensor of the ignition timing control system is installed on at least one camshaft for either exhaust or suction valves on an overhead cam at one of the cylinders belonging to either of the cylinder bank rows.

10 Claims, 4 Drawing Sheets

SYSTEM AND METHOD FOR CONTROLLING IGNITION TIMING FOR INTERNAL COMBUSTION ENGINE HAVING CYLINDER BANKS

BACKGROUND OF THE INVENTION (1) Field of the invention

The present invention relates to a system and method for controlling ignition timing applicable to an internal combustion engine having cylinder banks such as a V-type or flat-type engine.

(2) Background of the art

Various ignition timing control systems and methods have been proposed using microcomputers.

One of the previously proposed ignition timing control systems is exemplified by Japanese Patent Application First Publication No. Showa 55-112861 published on Sept. 1, 1980.

The previously proposed ignition timing control system disclosed in the above-identified Japanese Patent Application First Publication includes a control unit having a microcomputer. The control unit includes a memory having an ignition timing map allocated according to an engine revolution speed N and a basic fuel injection quantity $T_p$. The engine revolution speed N is derived from an output signal of a crank angle sensor. The basic fuel injection quantity $T_p$ is derived on the basis of the engine revolution speed N and intake air quantity Q determined from the output signal of an airflow meter. Then, an optimum ignition timing is generally derived by comparing the ignition timing map with the signals indicating the present engine revolution speed N and basic fuel injection quantity $T_p$. An ignition device receives an ignition signal derived at a time corresponding to the optimum ignition timing and ignites an air/fuel mixture supplied to a corresponding cylinder at the time described above.

In general, in a V-type internal combustion engine having double overhead camshafts (DOHC, also called; twin cam), a pair of cam shafts are arranged for suction and exhaust valves on each cylinder head of left and right cylinder banks, respectively. Each cam shaft receives rotational force from a crankshaft via a timing chain and cam chain. A crank angle sensor is installed on one of the cam shafts for the exhaust valves on one side (for example, right side) of the respective banks so as to detect the cam shaft revolution of the right side exhaust valve bank as the engine revolution speed and also to detect a crank angular position within 1°. The control unit determines the ignition timing on the basis of the respective signals derived from the crank angle sensor.

However, since, in the previously proposed ignition timing control system disclosed in the above-identified Japanese Patent Application First Publication, the engine revolution speed and so on is derived from the crank angle sensor by the number of cam revolutions per unit of time (unit angle). That is to say, although the crankshaft is always rotated with uniform motion, each cam shaft generates a non-uniform rotation (i.e., variation in the rotational motion occurs) due to variations in a tension of the timing chain and valve spring reactions of each suction and exhaust valve and due to deviations in cam profiles inherent to the cam shafts.

Figure 5:
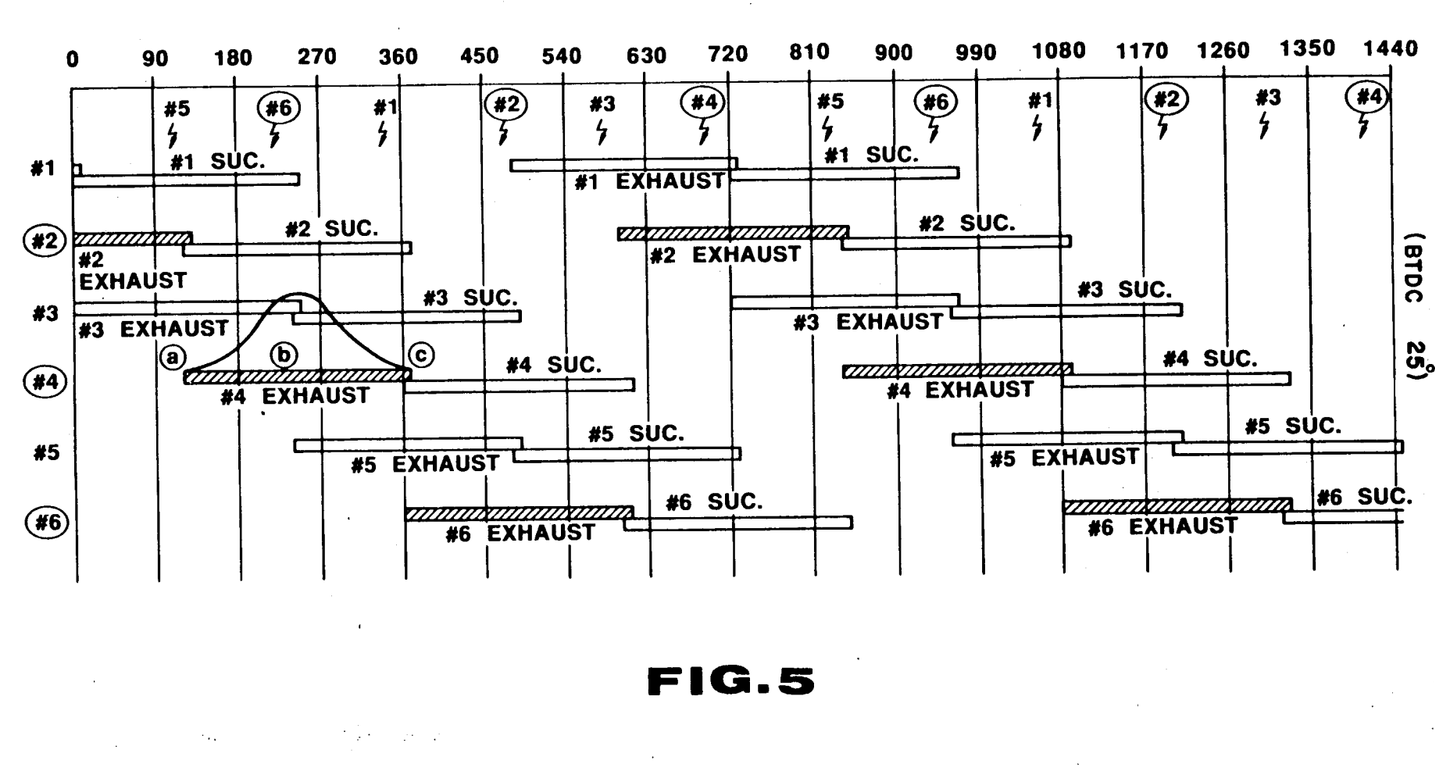
FIG. 5 is a characteristic graph indicating lift timings of suction and exhaust valves in a V-type six-cylinder engine.

Especially, in V-type six cylinder engines, a timing at which the exhaust valves are lifted does not overlap over a crank angular range in the vicinity to the crank angle of 240°, as shown in FIG. 5, but is continued over the crank angular range.

For example, for the exhaust strokes of second, fourth, and sixth cylinders in the right side bank, the exhaust stroke of the second cylinder is started at the same time when the exhaust stroke of the fourth cylinder is ended. Furthermore, the exhaust stroke of the sixth cylinder is started at the same time when the exhaust stroke of the fourth cylinder is ended. Hence, a characteristic graph of valve lift timings indicates a continous waveform. On the other hand, for first, third, and fifth cylinders on the right bank, a similar continous waveform charactersitic is exhibited.

For suction valves, the same result is obtained.

In this way, the cam shafts generate such variations of rotational motion and such variations are detected by means of the crank angle sensor and input to the control unit.

Consequently, variation in the ignition timing occurs between left and right banks. In general, more retardation of the ignition timing occurs in the cylinders of the one bank in which the crank angle sensor is installed than that in the other bank in which no crank angle sensor is installed.

Therefore, the accuracy of the ignition timing is reduced, an engine output torque is accordingly reduced, and a large difference occurs in exhaust gas temperature between the left and right banks. Furthermore, a controllability of an engine knock avoidance is worsened. It is noted that a normal ignition timing is set in a vicinity to 25° before piston top dead center (BTDC 25°) in an explosion stroke (refer to FIG. 5).

SUMMARY OF THE INVENTION

It is, therefore, an object of the present invention to provide an improved system and method for controlling ignition timing for a V type internal combustion engine having a high accuracy in the ignition timing control.

The above-described object can be achieved by providing a system for controlling ignition timing for an internal combustion engine, comprising: a) first means for detecting engine load; b) second means installed on at least one camshaft of a cylinder bank row of the engine, the camshaft being rotated in synchronization with an engine crankshaft, for producing and outputting at least a reference signal whenever the corresponding camshaft on which the second means is located is rotated through a predetermined angle and a unit angle signal whenever the corresponding camshaft has rotated through the unit angle; c) third means for deriving an optimum ignition timing angle on the basis of the engine load and an engine revolution speed derived on the basis of the unit angle signal output by the second means; d) fourth means for identifying a number of a cylinder to be ignited from among the cylinders on the cylinder bank rows at least depending on which one of the cylinder bank rows the number of the cylinder falls on the basis of the reference signal derived by the second means; and e) fifth means for deriving a value of difference caused between the different cylinder bank rows on the basis of a result of identification of the cylinder number and correcting the optimum ignition timing on the basis of the difference value derived by the third means.

The above-described object can also be achieved by providing a system for controlling ignition timing for an internal combustion engine having cylinder bank rows, comprising: a) first means for detecting engine operating conditions, the first means including second means for detecting an engine revolution speed on the basis of, at least, camshaft revolutions; b) third means for deriving an optimum ignition timing for all cylinders in cylinder bank rows on the basis of the engine operating conditions; c) fourth means for identifying a number of a cylinder to be ignited on the basis of an output signal derived by the second means; d) fifth means for correcting the ignition timing for the cylinders belonging to the cylinder bank row of the identified cylinder so that a difference between the ignition timings for the cylinders belonging to either of the cylinder bank rows is eliminated according to the result of the identification of the cylinder number by the fourth means.

The above-described object can also be achieved by providing a method for controlling ignition timing for an internal combustion engine, comprising ther steps of: a) detecting an engine load; b) installing a crank angle sensor on at least any one camshaft on cylinder bank rows of the engine, the camshaft being rotated in synchronization with an engine crankshaft, and producing and outputting at least a reference signal whenever the corresponding camshaft on which the second means is located is rotated through a predetermined angle and a unit angle signal whenever the corresponding camshaft has rotated through the unit angle; c) deriving an optimum ignition timing angle on the basis of the engine load and engine revolution speed derived on the basis of the unit angle signal output by the crank angle sensor; d) identifying a number of a cylinder to be ignited from among the cylinders in the cylinder bank rows at least depending on whether the number of cylinder falls in one of the cylinder bank rows on the basis of the the reference signal derived by the crank angle sensor; and e) deriving a value of difference caused between the different cylinder bank rows on the basis of the result of identification of the cylinder number and correcting the optimum ignition timing on the basis of the difference value.

BRIEF DESCRIPTION OF THE DRAWINGS

FIGS. 4 (A) and 4 (B) are explanatory views of set ignition timings in left and right cylinder banks of the engine shown in FIG. 1.

DETAILED DESCRIPTION OF THE PREFERRED EMBODIMENT

Reference will hereinafter be made to the drawings in order to facilitate a better understanding of the present invention.

Figure 1:
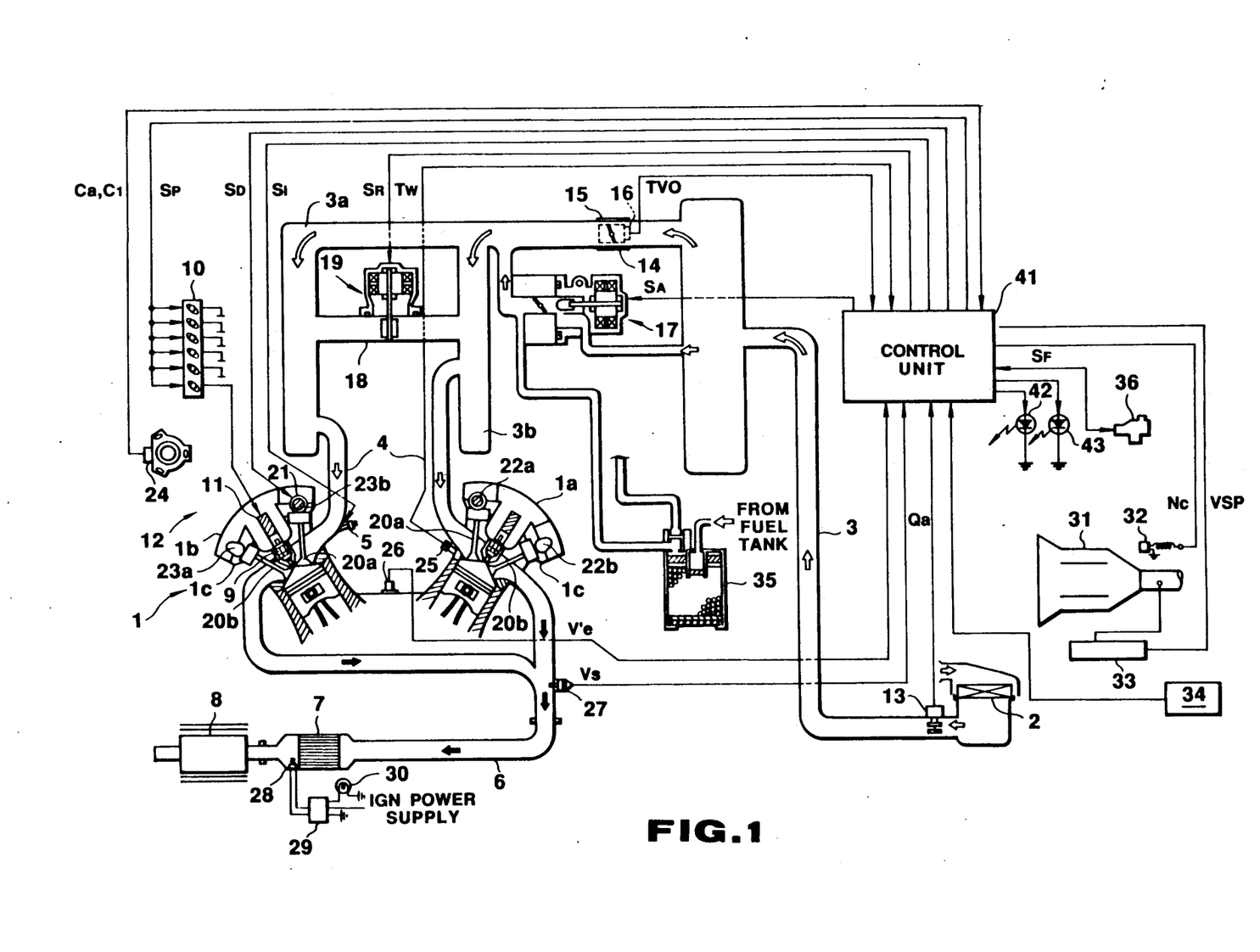
FIG. 1 is a circuit block diagram of a system for controlling ignition timing applicable to V-type internal combustion engine in a preferred embodiment according to the present invention.
Figure 2:
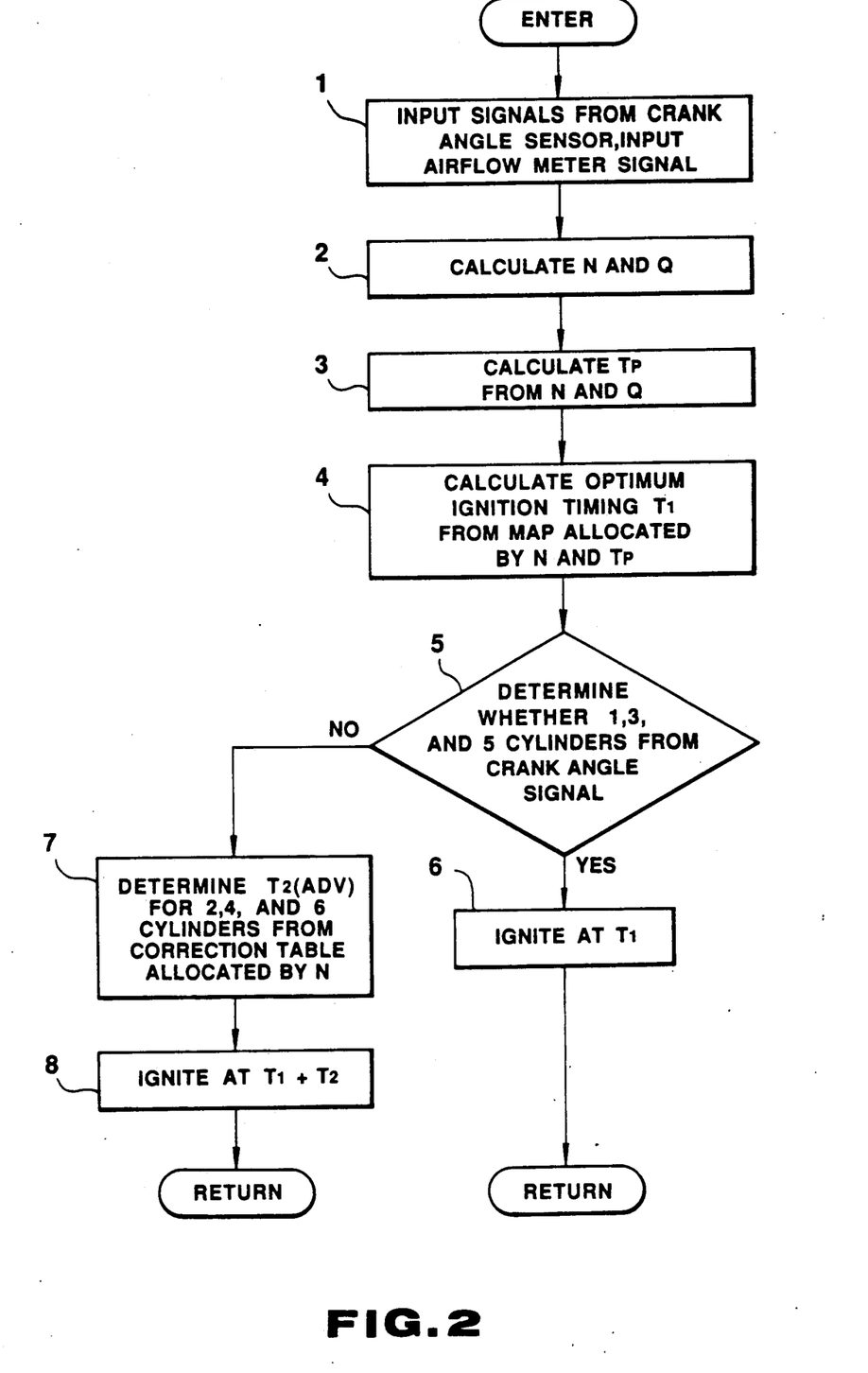
FIG. 2 is an operational flowchart of an ignition timing control executed in the system shown in FIG. 1.

FIGS. 1 and 2 show a preferred embodiment of a system for controlling ignition timing for an internal combustion engine applicable to a twin cam (DOHC) V-type internal combustion engine.

In FIG. 1, a V-type internal combustion engine having double overhead cam shafts (twin cam type) 1 has a right cylinder bank 1a and left cylinder bank 1b. The right cylinder bank 1a is constituted by first, third, fifth cylinders. The left cylinder bank 1b is constituted by second, fourth, and sixth cylinders.

Intake air is supplied to each cylinder via an air cleaner 2, intake air passage 3, and intake manifold 4, in a direction denoted by an arrow-marked direction.

Fuel supplied from a fuel tank is injected through an injector 5 installed for each cylinder in response to an injection signal $S_j$. An exhaust gas combusted in any one of the cylinders is introduced into a catalytic converter 7 via an exhaust tube 6. Harmful components of the exhaust gas are clarified through the catalytic converter 7 and exhausted through a muffler 8.

An ignition plug 9 is installed on each cylinder and receives a high voltage surge $P_i$ from an ignition coil 11 via a power transistor unit 10. An ignition device 12 is constituted by the ignition plugs 9, the power transistor unit 10, and ignition coil 11. The ignition device 12 generates and discharges the high voltage surge $P_i$ in response to the ignition signal $S_p$. The air/fuel mixture in any one of the cylinders is ignited, burned, and exhausted in response to the high voltage surge $P_i$.

Intake air quantity Q is detected by means of an airflow meter 13 of a hot wire type and is controlled by means of a throttle valve 15 installed in a throttle chamber 14 of the intake air passage 3. An opening angle TVO of the throttle valve 15 is detected by means of an opening angle sensor 16. The intake air quantity bypassing the throttle valve 15 is adjusted by means of an AAC (Auxiliary Air Control) valve 17 so that the number of engine idling revolutions per unit time is controlled in a feedback control mode to reach a target value.

The AAC valve 17 is driven on the basis of an auxiliary air quantity control signal $S_A$.

A variable air suction control valve 19 is installed in a linkage passage 18 intervened between a branch passage 3a and a branch passage 3b.

When the engine operating condition falls in a low engine speed range, the variable air suction control valve 19 is closed in response to a variable suction air control signal $S_R$ so as not to conduct between the branched passages 3a, 3b. Therefore, the intake air passages of the left and right banks 1a, 1b are independent so that an intake port is defined from the throttle valve 15 to the suction valve 20. Therefore, this results a longer intake port. Then, since a suction efficiency is enhanced due to an intake air inertia effect and engine output torque is increased.

On the other hand, when the engine operating condition falls in a high speed range, the variable suction air control valve 19 is opened in response to the variable suction air control signal $S_R$. The branched passages 3a, 3b are conducted to each other so that a mutual air suction interference occurs. Thus, since intake air is sucked substantially from a bold and short port of the intake manifold 4, intake air resistance is reduced and high engine output is achieved.

A closing time duration of the air suction valve 20a is determined by variably controlling cam phase difference through an oil pressure (hydraulic) control using a variable valve timing control valve 21. When engine operating conditions fall in a low or intermediate speed range and/or a high load range, a time at which the suction air valve 20 is closed is advanced earlier to increase the air suction efficiency. During the engine idling or high-engine speed and high-load range, a time at which the suction air valve 20 is closed is retarded to reduce an overlap duration of the suction and exhaust strokes. Thus, engine stability and engine output are increased. It is noted that the variable valve timing control valve 21 varies the cam phase difference through oil pressure on the basis of a duty ratio of the variable valve timing control signal $S_D$ to adjust the valve timings.

In addition, the engine 1 is provided with two pairs of cam shafts 22a, 22b and 23a, 23b supported on each cylinder head 1c, 1c of the left and right cylinder banks 1b, 1a. The respective cam shafts opening and closing air suction valves 20a, 20a and exhaust valves 20b, 20b.

A rotational force of a crankshaft (not shown) is transmitted to the cam shafts 22a, 22b, 23a, 23b via a timing chain and cam chain. It is noted that a crank angle sensor 24 is attached around one of the cam shafts used for the exhaust valves of the left bank 1b. The crank angle sensor 24 outputs a reference signal Ca of a high level (H) pulse at a predetermined crank angular position before a piston reaches upper top dead center (TDC) in the compression stroke of each cylinder, e.g., BTDC 70° for each explosion stroke interval (120° in the case of the six cylinder engine, 180° in the case of a four cylinder engine) and outputs a unit signal $C_1$ whenever the crankshaft rotates through a unit angle (e.g., 2°). The number of pulses, e.g. of the unit angle signal $C_1$ is counted to derive the engine revolution speed N. A temperature $T_w$ of an engine coolant flowing through a water jacket of the engine is detected by means of a collant temperature sensor 25. Vibrations Ve generated by the engine body 1 is detected by means of an engine knock sensor 26. An oxygen sensor 27 detects an oxygen concentration Vs in the exhaust gas. A temperature of the exhaust gas is detected by means of an exhaust gas temperature sensor 28. It is noted that the exhaust gas temperature sensor 28 is connected to a switching module 29. The switching module 29 turns on an exhaust gas temperature warning lamp 30 on the basis of an output signal of the exhaust gas temperature sensor 28.

A neutral position Nc of a transmission 31 is detected by means of a neutral switch 32. A vehicle speed VSP is detected by means of a vehicle speed sensor 33. The engine idling state is detected by means of an idling switch 34. Numeral 35 denotes a canister. Numeral 36 denotes a fuel pump.

Each output signal from the airflow meter 13, throttle valve opening angle sensor 16, crank angle sensor 24, coolant temperature sensor 25, knock sensor 26, oxygen sensor 27, neutral switch 32, vehicle speed sensor 33, idle switch 34, key switch (not shown), and battery (not shown) is input to a control unit 41. The control unit 41 includes a microcomputer. The control unit 41 calculates processing values required for the ignition timing control (combustion control) on the basis of sensed information in accordance with a program stored in an internal memory. On the basis of the calculated results, each signal $S_i$, $S_p$, $S_A$, $S_R$, $S_D$, and $S_F$ is ouput to drive the injectors 5, power transistor unit 10, AAC valve 17, variable suction air control solenoid valve 19, variable valve timing control valve 21 and fuel pump 36 so that the driving condition of the engine 1 is controlled at optimum. Numerals 42, 43 denote a monitor check lamp, issuing a warning to a driver (or seviceman) on the basis of a failure detection signal of the control unit 41.

Next, an operation of the ignition timing control system shown in FIG. 1 will be described below.

FIG. 2 shows a program flowchart of the ignition timing control executed by the control unit 41. The program shown in FIG. 2 is executed whenever a predetermined time has passed (e.g., 10 milliseconds).

In a step 1, the control unit 41 fetches the output signals of the crank sensor 24 and of the airflow meter 13.

In a step 2, the control unit 41 calculates the engine revolution speed N and intake air quantity Q from the fetched signals described above.

In a step 3, the control unit 41 calcuates a basic fuel injection pulsewidth $T_p$ (corresponds to load data).

In a step 4, the control unit 41 looks up an optimum ignition timing $T_l$ for a predetermined table map with the basic injection pulse width $T_p$ and the engine revolution speed N as parameters. The ignition timing map is exemplified by a U.S. Pat. No. 4,658,789 issued on Apr. 21, 1987 (FIG. 3), the disclosure of which is hereby incorporated by reference.

Furthermore, in a step 5, the control unit 41 identifies a number of a cylinder to be ignited on the basis of the input crank angle signal from the crank angle sensor 24. In detail, the control unit 41 determines whether the number of the cylinder to be ignited is any one of the first, third, and fifth cylinders in the right cylinder bank 1a on which no crank angle sensor 24 is installed.

The method of identifying the number of cylinder to be ignited is such that at first stage of installing the crank angle sensor 24, the crank angle sensor 24 is set so as to output the reference signal $C_a$ indicating the value of BTDC 70° in the compression stroke of the first cylinder. Another method of identifying the cyliner number is exemplified by U.S. Pat. No. 4, 747, 389 issued on May 31, 1988 and by U.S. Pat. No. 4, 497, 306 issued on Feb. 5, 1985, the contents of which are hereby incorporated by reference.

If YES, i.e., the control unit 41 identifies that the cyliner number is any one of the first, third, and fifth cylinders, the routine goes to a step 6, in which a signal indicating an optimum ignition timing $T_1$ according to the instaneous engine operating condition is output to the ignition device 12.

If NO, i.e., the engine cylinder number is any one of the second, fourth, and sixth cylinders, the routine goes to a step 8.

Figure 3:
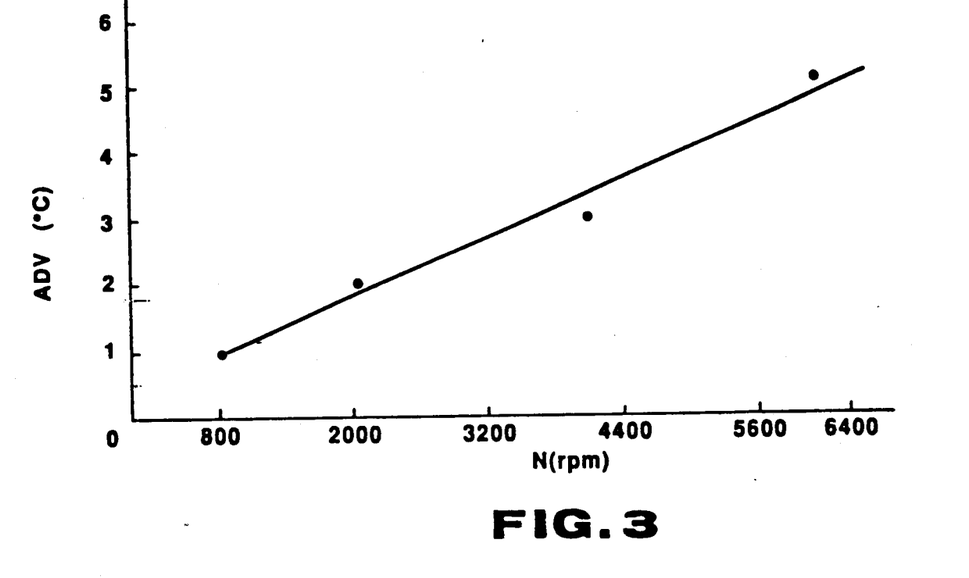
FIG. 3 is a correction quantity map used in the system shown in FIG. 1.

In the step 8, the control unit 41 looks up a correction quantity for the ignition timing, i.e., an advance angle correction value $T_2$ from a correction quanitity map shown in FIG. 3, with the engine revolution speed N and ignition advance angle correction value ADV as parameters.

In the correction quantity map shown in FIG. 3, the advance angle correction value $T_2$ is set to 1°, e.g., when the engine revolution speed N is in the vicinity to 800 r. p. m. during such as engine idling. The advance angle correction value $T_2$ is set to about 2° to 3° when the value of N indicates 2000 r. p. m. to 4400 r. p. m. during such as a normal driving condition. In addition, the value of $T_2$ at a time of high engine revlution speed, e.g., about 6000 r. p. m. is set to about 5°.

In a step 8, the control unit 41 outputs to the ignition device 12 the ignition signal indicating the result of addition of the optimum ignition timing advance angle $T_1$ and advance angle correction value $T_2$.

In the way described above, in the preferred embodiment, the ignition timing for the one cylinder bank 1b at which the optimum ignition timing is retarded with respect to the real optimum ignition timing is controlled so as to coincide with the optimum ignition timing at the other bank side 1a.

Figure 4A:
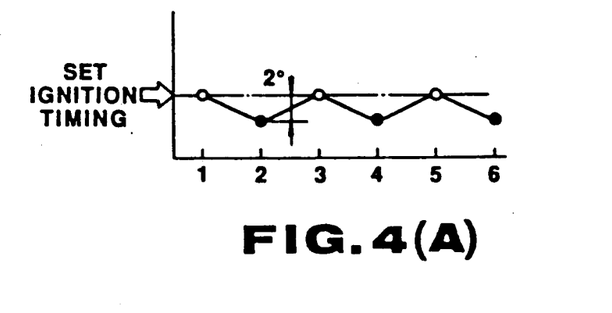
Figure 4B:
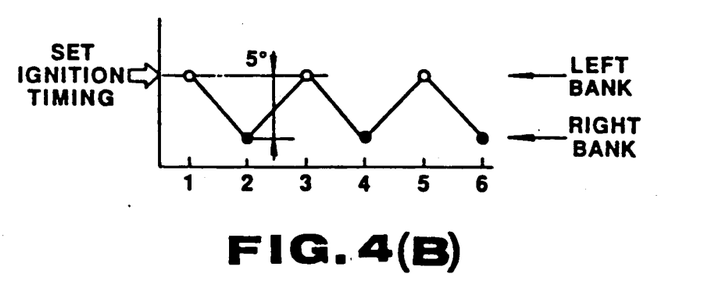

As shown in FIGS. 4 (A) and 4 (B), the ignition timings for the second, fourth, and sixth cylinders are advanced in such a way as to be about 2° at 2000 r. p. m. and about 5° at 6000 r. p. m.. Therefore, variations of the ignition timings between both banks 1a, 1b can be prevented and preferable ignition timings can be achieved. Consequently, the engine output can be increased and a difference in the exhaust gas temperature of both cylinder banks can smoothly be reduced. In addition, knock avoidance controllability can be improved.

It is noted that the optimum ignition timing is corrected on the basis of the coolant temperature $T_w$.

In the preferred embodiment, the crank angle sensor 24 is installed at the side of the left bank 1b. Alternatively, the crank angle sensor 24 may be installed at the side of the right cylinder bank 1a only. Alternatively, crank angle sensors 24 may be installed at both cylinder banks 1a, 1b.

The present invention is applicable not only to the V-type internal combustion engines but also to flat type internal combustion engines.

It is noted that the advance angle correction value $T_2$ may be calculated in place of being looked up on the map shown in FIG. 3.

As described hereinabove, in the system and method for controlling ignition timing according to the present invention, the variations in the ignition timings between the cylinders belonging to the left and right cylinder banks due to the variations in the revolutions of the cam shafts can sufficiently be prevented and highly accurate ignition timing control can be achieved. Consequently, the engine output can be enhanced, the difference in the exhaust gas temperature between both left and right cylinder banks can be reduced, and the knock avoidance controllability can be improved.

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for controlling ignition timing for an internal combustion engine, comprising:
   a) first means for detecting an engine load;
   b) second means installed on at least any one camshaft on a cylinder bank row of the engine, the camshaft being rotated in synchronization with an engine crankshaft, for producing and outputting at least a reference signal whenever the corresponding camshaft on which the second means is located is rotated through a predetermined angle and a unit angle signal whenever the corresponding camshaft has rotated through the unit angle,
   c) third means for deriving an optimum ignition timing angle on the basis of engine load and engine revolution speed derived on the basis of the unit angle signal output by the second means;
   d) fourth means for identifying a number of a cylinder to be ignited from among the cylinders on the cylinder bank rows depending, at least, on which of the cylinder bank rows the number of the cylinder identified by the fourth means belongs to, determined on the basis of the reference signal derived by the second means; and
   e) fifth means for deriving a value of difference caused between the different cylinder bank rows on the basis of a result of identification of the cylinder number and correcting the optimum ignition timing on the basis of the difference value derived by the third means.

2. A system for controlling ignition timing as set forth in claim 1, wherein the engine is V-type six-cylinder internal combustion engine having left and right cylinder bank rows, each cyliner head having a pair of camshafts for suction valves and for exhaust valves thereof.

3. A system for controlling ignition timing as set forth in claim 2, wherein the second means comprises a crank angle sensor located on one of the camshafts for the exhaust valves on one of the cylinder bank rows.

4. A system for controlling ignition timing as set forth in claim 3, wherein the crank angle sensor is located on the camshaft for the exhaust valves on the left cylinder bank row.

5. A system for controlling ignition timing as set forth in claim 4, wherein the fourth means identifies the number of the cylinder as to whether the cylinder to be ignited is any one of first, third, and fifth cylinders and wherein the fifth means adds the difference value between the optimum ignition timings for the left and right cylinder values to the optimum ignition timing for the right cylinder bank row when the fourth means identifies the number of the cylinder to be ignited as any one of the second, fourth, and sixth cylinders.

6. A sytem for controlling ignition timing as set forth in claim 5, wherein the fifth means derives the difference value from a map with a correction advance angle value and engine revolution speed as parameters.

7. A system for controlling ignition timing as set forth in claim 6, wherein the fifth means derives the difference value of the correction advance angle as about 2° at an engine revolution speed of 2000 r.p.m. and as about 5° at an engine revolution speed of 6000 r.p.m.

8. A system for controlling ignition timing for an internal combustion engine having cylinder bank rows, comprising:
   a) first means for detecting engine operating conditions, the first means including second means for detecting an engine revolution speed on the basis of at least camshaft revolutions;
   b) third means for deriving an optimum ignition timing for all cylinders on the basis of the engine operating conditions;
   c) fourth means for identifying a number of a cylinder to be ignited on the basis of an output signal derived by the second means;
   d) fifth means for correcting the ignition timing for the cylinders belonging to one of the cylinder bank rows so that a difference between the ignition timings for the cylinders belonging to either of the cylinder bank rows is eliminated according to the result of identification of the cylinder number by the fourth means.

9. A system for controlling ignition timing as set forth in claim 8, wherein the first means includes sixth means for detecting an engine coolant temperature and the optimum ignition timing values are corrected according to the coolant temperature.

10. A method for controling ignition timing for an internal combustion engine, comprising ther steps of:
   a) detecting engine load;
   b) installing crank angle sensor on at least one of the camshafts on cylinder bank rows of the engine, the camshafts being rotated in synchronization with an engine crankshaft, and producing and outputting at least, a reference signal whenever the corresponding camshaft on which the second means is located is rotated through a predetermined angle and, a unit angle signal whenever the corresponding camshaft has rotated through the unit angle;

c) deriving an optimum ignition timing angle on the basis of the engine load and an engine revolution speed derived on the basis of the unit angle signal output by the crank angle sensor;

d) identifying a number of the cylinder to be ignited from among the cylinders on the cylinder bank rows at least depending on which of the cylinder bank rows includes the identified cylinder, on the basis of the the reference signal derived by the crank angle sensor; and e) deriving a value of difference caused between the different cylinder bank rows on the basis of a result of identification of the cylinder number and correcting the optimum ignition timing on the basis of the difference value.

* * * * *

UNITED STATES PATENT AND TRADEMARK OFFICE
CERTIFICATE OF CORRECTION

PATENT NO. : 5,014,669
DATED : May 14, 1991
INVENTOR(S) : TAKASAKI et al

It is certified that error appears in the above-identified patent and that said Letters Patent is hereby corrected as shown below:

On the title page, item:

[30] Foreign Application Priority Data

--June 16, 1989   Japan...............P 1-154129--.

Signed and Sealed this

Twenty-eighth Day of June, 1994

Attest:

BRUCE LEHMAN

*Attesting Officer*  Commissioner of Patents and Trademarks